United States Patent
Morone et al.

(10) Patent No.: US 11,156,254 B2
(45) Date of Patent: Oct. 26, 2021

(54) CLUTCH, IN PARTICULAR CLUTCH FOR MOTORCYCLES, AND RELATED MOUNTING METHOD

(71) Applicant: ADLER S.P.A., Rovereto (IT)

(72) Inventors: Alfio Morone, Milan (IT); Massimiliano Fumagalli, Missaglia (IT)

(73) Assignee: Adler S.P.A., Rovereto (IT)

( * ) Notice: Subject to any disclaimer, the term of this patent is extended or adjusted under 35 U.S.C. 154(b) by 219 days.

(21) Appl. No.: 16/496,833

(22) PCT Filed: Mar. 15, 2018

(86) PCT No.: PCT/EP2018/056508
§ 371 (c)(1),
(2) Date: Sep. 23, 2019

(87) PCT Pub. No.: WO2018/172176
PCT Pub. Date: Sep. 27, 2018

(65) Prior Publication Data
US 2020/0318694 A1    Oct. 8, 2020

(30) Foreign Application Priority Data
Mar. 22, 2017 (IT) .................... 102017000031815

(51) Int. Cl.
*F16D 13/56* (2006.01)
*F16D 13/52* (2006.01)
(Continued)

(52) U.S. Cl.
CPC .......... *F16D 13/52* (2013.01); *F16D 25/0638* (2013.01); *B60Y 2200/12* (2013.01);
(Continued)

(58) Field of Classification Search
CPC .......... F16D 13/52; F16D 13/56; F16D 13/04; F16D 13/64; F16D 13/648; F16D 13/646;
(Continued)

(56) References Cited

U.S. PATENT DOCUMENTS 8,151,963 B2 * 4/2012 Kataoka .................. F16D 13/54
192/54.5
10,253,825 B2 * 4/2019 Imanishi ................. F16D 13/56
(Continued)

FOREIGN PATENT DOCUMENTS

EP    1058018 A2    12/2000
JP    S50119837 U    9/1975
(Continued)

OTHER PUBLICATIONS

International Search Report dated May 14, 2018 in connection with PCT/EP2018/056508.
(Continued)

*Primary Examiner* — Charles A Fox
*Assistant Examiner* — Ryan P Dodd
(74) *Attorney, Agent, or Firm* — Akerman LLP

(57) ABSTRACT

The present invention relates to a clutch (100) comprising: a fixed hub (101, 1101) comprising a central coupling hole (301) configured for coupling with a rotating shaft (1200); a movable hub (102, 1102) configured for being mounted along an axial direction onto the fixed hub (101, 1101); a plurality of discs (103) interposed between the fixed hub (101, 1101) and the movable hub (102, 1102). The fixed hub (101, 101) and the movable hub (102, 1102) are shaped so as to rotate jointly with each other and so as to axially slide with each other, getting farther or closer to each other so that the fixed hub (101, 1101) and the movable hub (102, 1102) exert a variable axial load onto the plurality of discs (103), thereby transmitting a torque. The movable hub (102, 1102)
(Continued)

comprises a central access hole (302) that is configured for allowing access to said central coupling hole (301) passing internally through the plurality of discs (103) interposed, so as to operate locking means (1201) for the coupling with the rotating shaft (1200). The present invention also relates to a method for mounting a clutch.

14 Claims, 9 Drawing Sheets

(51) Int. Cl.
  *F16D 25/0638* (2006.01)
  *F16D 13/64* (2006.01)

(52) U.S. Cl.
  CPC .......... *F16D 13/644* (2013.01); *F16D 13/648* (2013.01); *F16D 2013/565* (2013.01); *F16D 2300/12* (2013.01)

(58) Field of Classification Search
  CPC ............. F16D 13/644; F16D 2013/565; F16D 25/0638; F16D 2300/12
  See application file for complete search history.

(56) References Cited

U.S. PATENT DOCUMENTS

| | | | |
|---|---|---|---|
| 2008/0308382 A1* | 12/2008 | Kataoka | F16D 43/216 |
| | | | 192/93 R |
| 2009/0071792 A1 | 3/2009 | Kataoka et al. | |
| 2014/0235407 A1* | 8/2014 | Nonaka | F16D 13/54 |
| | | | 477/181 |
| 2015/0001028 A1 | 1/2015 | Yoshimoto et al. | |
| 2015/0260236 A1 | 9/2015 | Inayama | |
| 2015/0275982 A1* | 10/2015 | Tokito | F16D 13/56 |
| | | | 192/70.23 |
| 2020/0158194 A1* | 5/2020 | Kataoka | F16D 7/024 |
| 2020/0292010 A1* | 9/2020 | Kobayashi | F16D 13/56 |

FOREIGN PATENT DOCUMENTS

| | | |
|---|---|---|
| JP | S60184719 A | 9/1985 |
| JP | H08145074 A | 6/1996 |

OTHER PUBLICATIONS

Written Opinion of the International Searching Authority dated May 14, 2018 in connection with PCT/EP2018/056508.

* cited by examiner

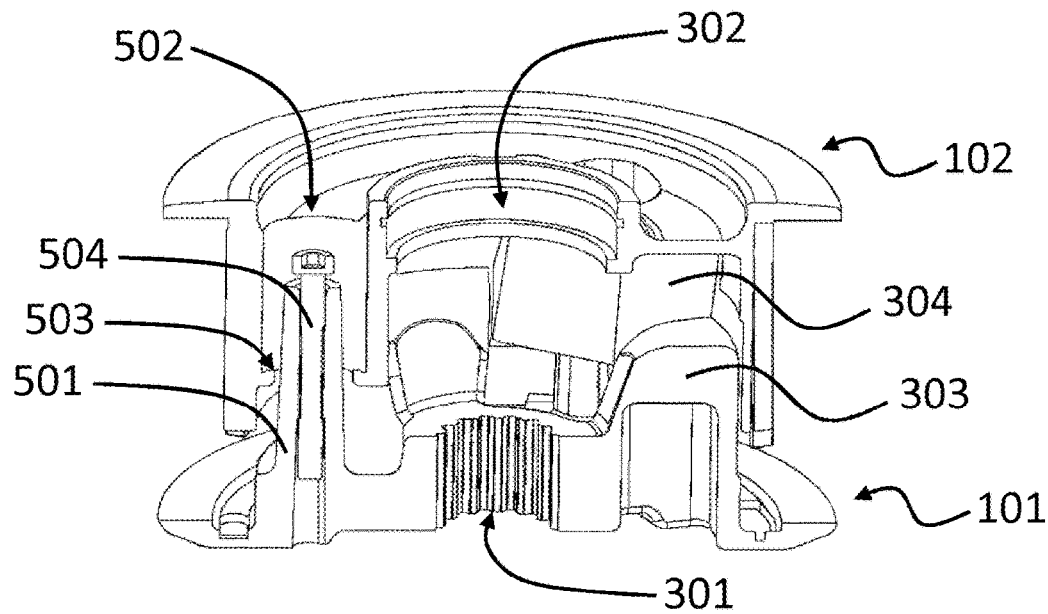
FIG. 11
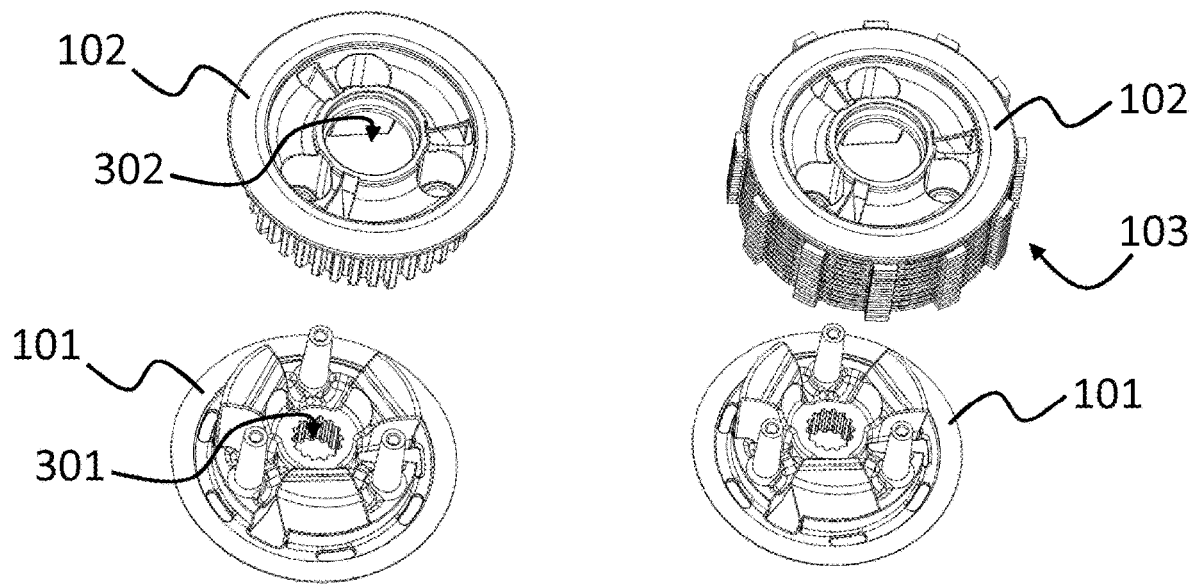
FIG. 12(a)　　FIG. 12(b)

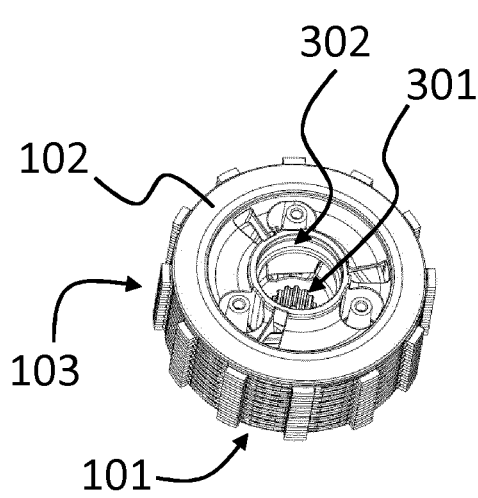
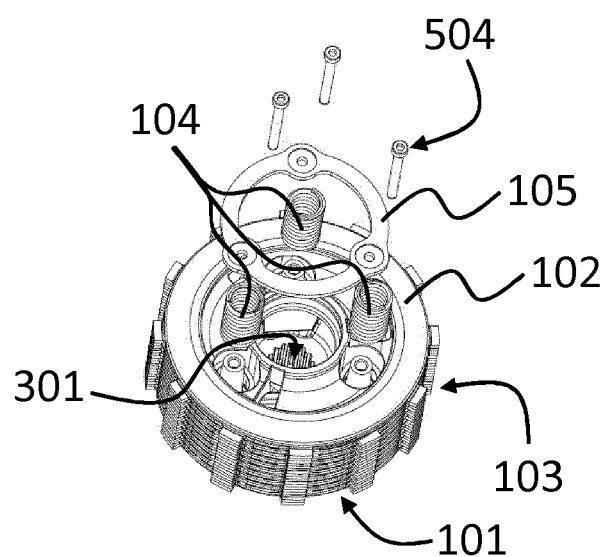
FIG. 12(c)    FIG. 12(d)
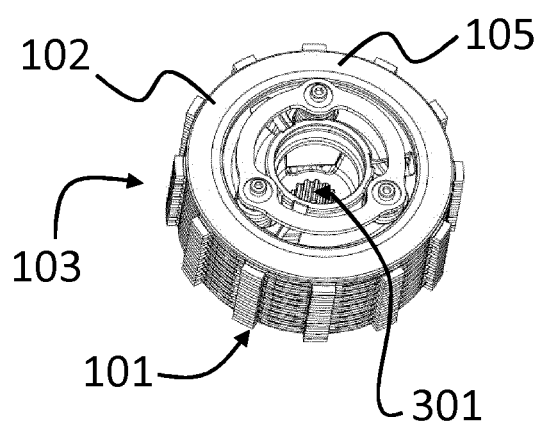
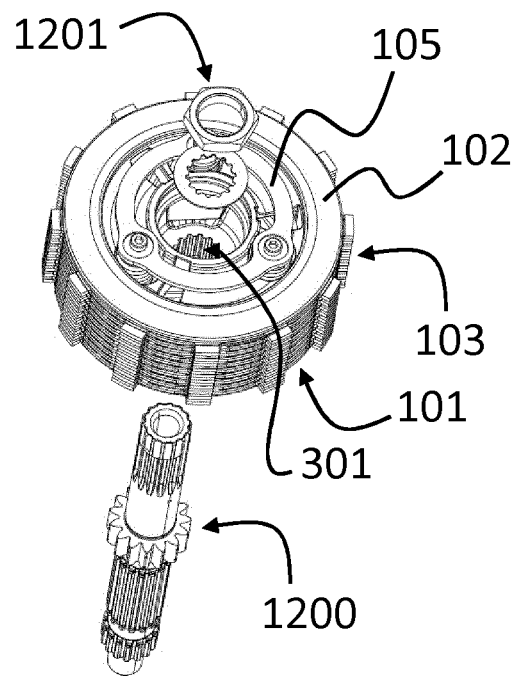
FIG. 12(e)    FIG. 12(f)

CLUTCH, IN PARTICULAR CLUTCH FOR MOTORCYCLES, AND RELATED MOUNTING METHOD

This application is a national phase of PCT/EP2018/056508, filed Mar. 15, 2018, and claims priority to Italian Patent Application No. 102017000031815, filed Mar. 22, 2017, the entire contents of both of which are hereby incorporated by reference.

TECHNICAL FIELD

The present invention relates to a clutch, in particular a pre-assembled clutch, and to a method for mounting a clutch.

In particular, the invention relates to a clutch comprising a fixed hub and a moveable hub, between which a plurality of clutch discs is interposed, which allow transmitting a torque when they are axially pushed towards each other.

In general, the invention relates to clutches for commanding the engagement of a rotary movement between rotating shafts, in particular in land vehicles and more particularly in motorcycles.

PRIOR ART

The use of a mechanical element called "clutch" for connecting two shafts with each other in rotary motion in a controlled manner is known.

Known clutches use a plurality of circular-crown plates or discs called "driving" or "driven" discs according to their function. The driving discs are constrained to a shaft connected to an engine, whereas the driven discs are constrained to a driven shaft of a user transmission.

Document EP1058018 (A2) to Adler S.p.A. relates to a clutch comprising a fixed hub, a movable hub, a plurality of discs and a pressure plate that, moving in an axial direction, allows engagement and disengagement of the clutch.

Known clutches adopt complex configurations that involve the presence of numerous, differently shaped elements to be assembled with each other.

Furthermore, in general, known clutches adopt mounting solutions that make their installation on the vehicle complex and laborious, since typically each of the discs must be installed singularly.

SUMMARY OF THE INVENTION

An object of the present invention is to solve some prior art problems.

A particular object of the present invention is to provide a clutch whose components have an optimized operation, so as to reduce the number and complexity thereof.

A further particular object of the present invention is to provide a clutch whose components are rationally assemblable with each other, thus simplifying the installation thereof.

Further general objects of the present invention contemplate providing the clutch with proper modulation and command smoothness, meanwhile effectively transferring the driving torque and moreover providing the clutch with proper reliability and resistance during use.

These and other objects are achieved by a clutch and a method for mounting a clutch according to the appended claims, which form integral part of the present disclosure.

A solution idea underlying the present invention is to provide a clutch comprising: a fixed hub with a central coupling hole configured for coupling with a rotating shaft; a moveable hub configured for being mounted along an axial direction onto the fixed hub; a plurality of discs configured for being interposed between the fixed hub and the moveable hub. The fixed hub and the moveable hub are shaped so as to rotate jointly with each other and so as to axially slide with each other, getting farther or closer such that the fixed hub and the moveable hub exert a variable axial load onto the plurality of discs, thereby transmitting a torque.

According to an aspect of the present invention, the moveable hub of the clutch comprises a central access hole configured for allowing access to the central coupling hole of the fixed hub, passing internally through the plurality of discs interposed, so as to operate locking means and to provide coupling of the clutch with the rotating shaft.

In particular, the clutch structure comprising a fixed hub and a moveable hub thus configured is advantageous in terms of assembly, since it has a more rational structure that does not need a pressure plate separated from the moveable hub.

By using a fixed hub and a moveable hub thus configured, it is possible to provide a clutch having a structure essentially consisting of the two hubs, thereby preserving all of the functionality features and reducing the complexity of the assembly.

Furthermore, advantageously, the central access hole simplifies the installation and mounting of the clutch, thus allowing locking means, such as a nut, to reach and lock the central coupling hole of the fixed hub on the rotating shaft.

In general, advantageously, the clutch according to the present invention can be pre-assembled and moreover allows reducing the number and complexity of the constitutive elements, to the advantage of an optimal operation and a more simplified maintenance for the vehicle on which the clutch is installed.

Preferably, by providing a plurality of discs mounted on the moveable hub, it is possible to provide a clutch having better modulation and command smoothness, transferring the driving torque on all of the driven discs even during the engagement, to the advantage of a better modulation.

According to a further aspect of the present invention, a method for mounting a clutch is provided, which comprises: providing a fixed hub comprising a central coupling hole; providing a moveable hub comprising a central access hole; providing a plurality of discs, in particular mounted on the moveable hub; providing the moveable hub mounted along an axial direction on the fixed hub, wherein the discs result interposed between the fixed hub and the moveable hub, and wherein the fixed hub and the moveable hub are shaped so as to rotate jointly with each other and so as to axially slide with each other, getting farther or closer so that the fixed hub and the moveable hub exert a variable axial load onto the plurality of discs, thereby transmitting a torque; coupling the central coupling hole with a rotating shaft; access the central coupling hole, through the central access hole and internally through the plurality of interposed discs; operating locking means so as to constrain the central coupling hole onto the rotating shaft.

In general, the method for mounting a clutch provides performing the mounting according to the aspects and details of the clutch according to the present invention.

Further features and advantages will become apparent from the following detailed description of a non-limiting preferred embodiment of the present invention and from the dependent claims, which outline preferred and particularly advantageous embodiments of the invention.

BRIEF DESCRIPTION OF THE DRAWINGS

The invention is disclosed with reference to the following figures, given by non-limiting example, wherein:

FIG. 11 shows a cross-sectional perspective view of the fixed hub and of the moveable hub of the clutch of FIG. 1.

In different figures, analogous elements will be indicated by analogous reference numbers.

DETAILED DESCRIPTION

Figure 1:
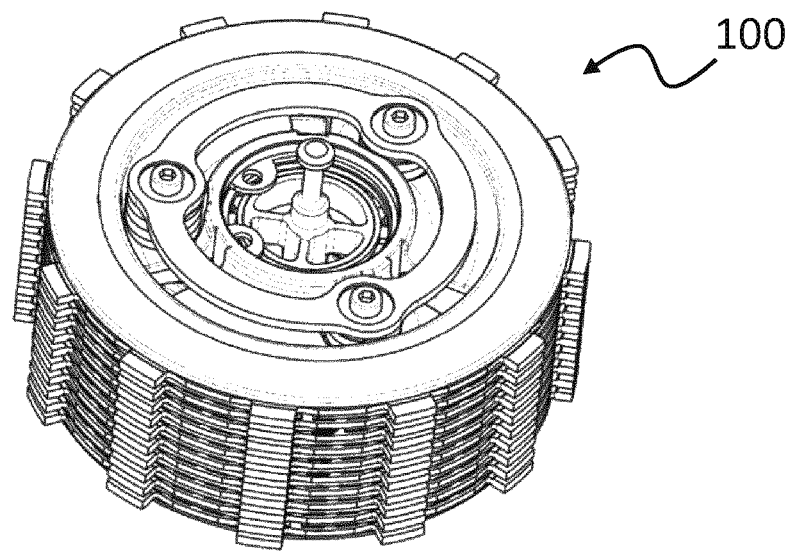
FIG. 1 shows a preferred embodiment of a clutch according to the present invention.

With reference to the example of FIG. 1, a preferred embodiment of a clutch 100 according to the present invention is shown.

The clutch 100 is of the two-piece type, comprising a fixed hub and a moveable hub, without a separated pressure plate acting onto the moveable hub.

In this embodiment, the clutch 100 is used to command the engagement of a rotary movement between an engine shaft and a primary gear fitted on a clutch housing in a vehicle, in particular in a motorcycle.

Figure 2:
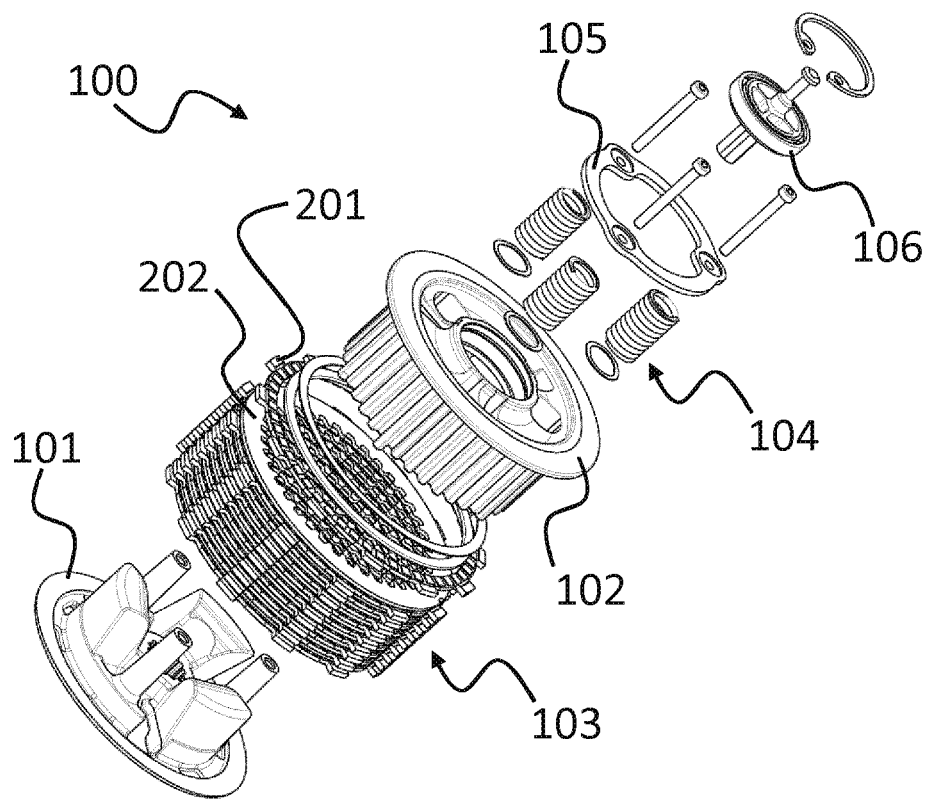
FIG. 2 shows an exploded view of the clutch of FIG. 1.

FIG. 2 shows an exploded view of the clutch 100, wherein the components are individually identifiable.

The clutch 100 comprises a fixed hub 101, in particular configured for being coupled with a rotating shaft of the vehicle on which the clutch is installed.

The clutch 100 then comprises a moveable hub 102, configured for being axially mounted on the fixed hub 101.

The clutch 100 comprises a plurality of discs 103, which are interposed between the fixed hub 101 and the moveable hub 102.

In particular, the discs 103 comprise a plurality of clutch discs 201 or driving discs, in particular coated discs, which comprise protruding elements configured for coupling with a clutch housing (not shown), which is in turn preferably connected to a driving shaft of the vehicle.

The discs 103 then comprise a plurality of driven discs 202, which comprise an internal toothing that is configured for coupling with the moveable hub 102, and which are arranged alternatively with respect to the clutch discs 201.

Moreover, preferably, the discs 103 comprise a turned driving disc, a cup spring and a spacer ring positioned proximally to the flange of the movable hub 102.

The fixed hub 101 and the moveable hub 102 are shaped so as to rotate jointly with each other when they are axially mounted; in this way, the fixed hub 101 and the moveable hub 102 are adapted to receive a torque.

Moreover, the fixed hub 101 and the moveable hub 102 are shaped so as to axially slide with each other, getting farther or closer such as to reduce or increase the axial force intensity on the discs 103. In this way, the fixed hub 101 and the moveable hub 102 exert a variable axial load on the discs 103, so that when the discs 103 are compressed with each other by the axial load, the clutch 100 allows transmitting a torque between the housing and the rotating shaft of the engine; on the other side, when the axial load decreases and the discs 103 are free to slide with each other, since the fixed hub 101 and the moveable hub 102 are sufficiently distanced, the clutch results disengaged, substantially without any transmitted torque.

By suitable sliding elements that will be described more in detail, the fixed hub 101 and the moveable hub 102 are configured for getting closer to each other when they are subjected to a driving torque, namely a torque provided by the engine of the vehicle, and are also configured for being distanced from each other when they are subjected to a motoring torque, i.e. a torque contrary to the driving torque provided by the engine of the vehicle.

Preferably, the clutch 100 further comprises a plurality of closing springs 104, preferably with respective spring spacers. Said closing springs 104 are configured for applying a closing axial load acting between the movable hub 102 and the fixed hub 101, so as to transmit the torque through the clutch discs. The sliding elements are configured for facilitating said closure, by getting the movable hub close to the fixed hub, so as to allow the use of less stiff springs for transmitting a same torque value, to the advantage of a greater ease of clutch command.

Preferably, the clutch 100 further comprises an annular retaining element 105 for the springs 104, which is retained by suitable fixing means such as screws, preferably fixed to the fixed hub 101 as it will be further described. In a variant, not shown, the retaining element 105 could be semi-annular or of other suitable shapes.

Moreover, preferably, the clutch 100 comprises a pusher 106 that is configured for commanding disengagement of the clutch 100 by getting the movable hub 102 farther from the fixed hub 101. Preferably, the pusher 106 is retained in a suitable seat provided on the moveable hub 102 by suitable retaining means, such as a Seeger ring. Preferably, the pusher 106 comprises a rolling element, such as a roller bearing.

The clutch 100 is preferably a multi-plate one, wherein the movable hub 102 comprises a flange having a free external face, namely not internally engaged in the coupling with the fixed hub 101. The flange of the movable hub 102 performs the pressure plate function. The movable hub 102 further comprises a drawing element provided with grooves, in which the teeth of the driven discs engage, as it will be further described.

The fixed hub 101 of the clutch 100 is instead constrained to a rotating shaft, preferably to the primary shaft of the gearbox.

The closing springs 104 provide a force that gets the fixed hub 101 and the moveable hub 102 axially closer to each other, thus closing the discs 103.

Preferably, the closing springs 104 have a suitable spring constant that can confer a lever command that is light and smooth.

Advantageously, there is a further force that gets the fixed hub 101 and the movable hub 102 axially closer to each other, thus closing the discs 103; said force is provided by the sliding elements that are on the respective movable hub 102 and fixed hub 101, which slide with respect to each other constrained in mutual rotation by a grooved coupling having a helical path.

The direction of the helix of the sliding elements is such that, by accelerating, the movable hub 102 and the fixed hub 101 tend to "close" with respect to each other, thus increasing the axial load acting onto the pack of the discs 103, which is added to the force of the springs 104.

On the contrary, when the motoring torque is sufficiently greater than the driving torque (typically during the throttle release phase or in the braking phase on a motorcycle), the direction of the helix of the sliding elements is such that the movable hub 101 and the fixed hub 102 tend to "open" with respect to each other, counteracting the force of the springs 104 and obtaining the effect of reducing the axial load acting onto the discs, in a completely automatic way and with no need of "user operation".

In the clutch 100, the slope of the sliding elements, like the springs 104, is thus a calibration element for the system: the more inclined the grooves, the greater the influence of the torque on the load applied onto the discs 103.

Therefore, the clutch 100 provides a torque enthralling effect, in addition to a slipper clutch function with back-torque limiter.

The torque enthralling effect allows reducing (in general more than halve) the axial load that the springs 104 must provide, drastically reducing the effort required at the lever to command the clutch, thus making the driving/riding more comfortable.

Figure 3:
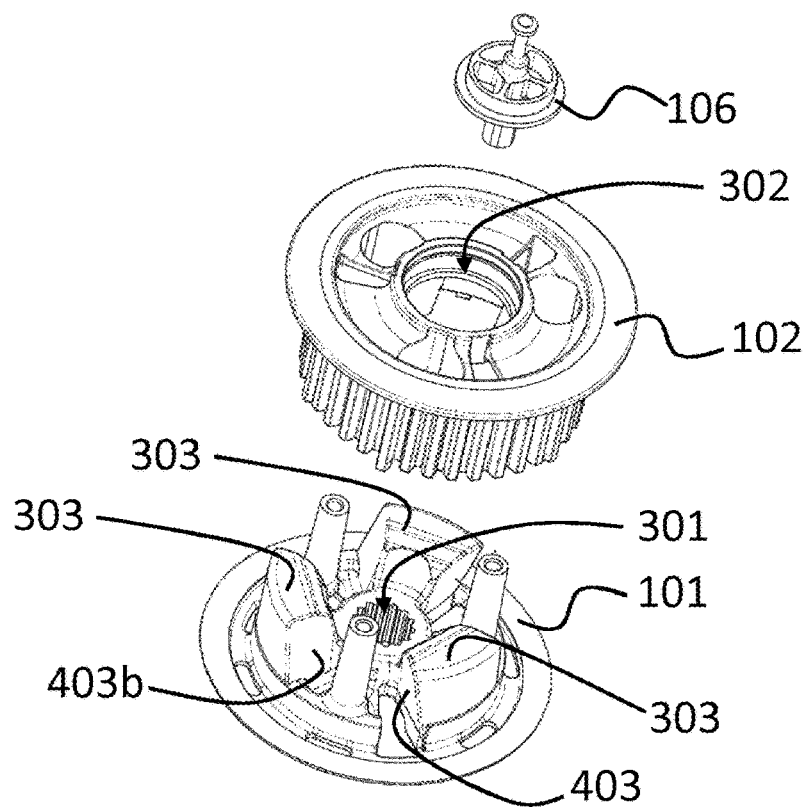
FIG. 3 shows an exploded view of the fixed hub, of the moveable hub and of the pusher of the clutch of FIG. 1.

FIG. 3 shows an exploded view of the fixed hub 101, of the movable hub 102 and of the pusher 106.

In this view it is possible to notice that the fixed hub 101 comprises a central coupling hole 301 that is shaped so as to provide a coupling with a rotating shaft of the vehicle.

In this view it is further possible to notice that the movable hub 102 comprises a central access hole 302, in particular made on the flange of the movable hub 102.

Said central access hole 302 allows access to the central coupling hole 301 once the clutch has been assembled. In particular, the central access hole 302 allows accessing the central coupling hole 301 by passing internally through the discs 103 interposed (not visible in FIG. 3) and unimpeded by the further elements of the fixed hub 101 or of the movable hub 102.

In this way, through the central access hole 302, it is possible to introduce and operate locking means, such as for instance a nut, for stably coupling the fixed hub 101 with the respective rotating shaft, on which the central coupling hole 301 is mounted.

In this way, it is possible to provide a pre-assembled clutch 100, as it will be further described.

Preferably the locking means comprise a nut, introduced during mounting by passing through the central access hole 302. Preferably, the nut is configured for fixing the central coupling hole 301 by threading directly on a threaded end of a rotating shaft, of the engine of the concerned vehicle.

According to a possible variant of the locking means (not shown), a clip or elastic-ring locking system could be provided, which could be already arranged inside the pre-assembled clutch and simply be operated for locking, through the access provided by the central access hole 302. This variant would be suitable for low loads, where no stresses occur, which may compromise the coupling on the rotating shaft.

The fixed hub 101 preferably comprises first sliding elements 303, configured for interacting with respective second sliding elements (not visible) inside the movable hub 102, to define sliding surfaces according to a helix that imposes a spacing movement according to a predetermined law between the movable hub 102 and the fixed hub 101, according to what has already been described.

In general, the particular structure of the fixed hub 101 comprising the first sliding elements 303 separated from each other allows a better lubricant flow directly on the drawing zone engaged by the clutch discs 103.

Figure 4:
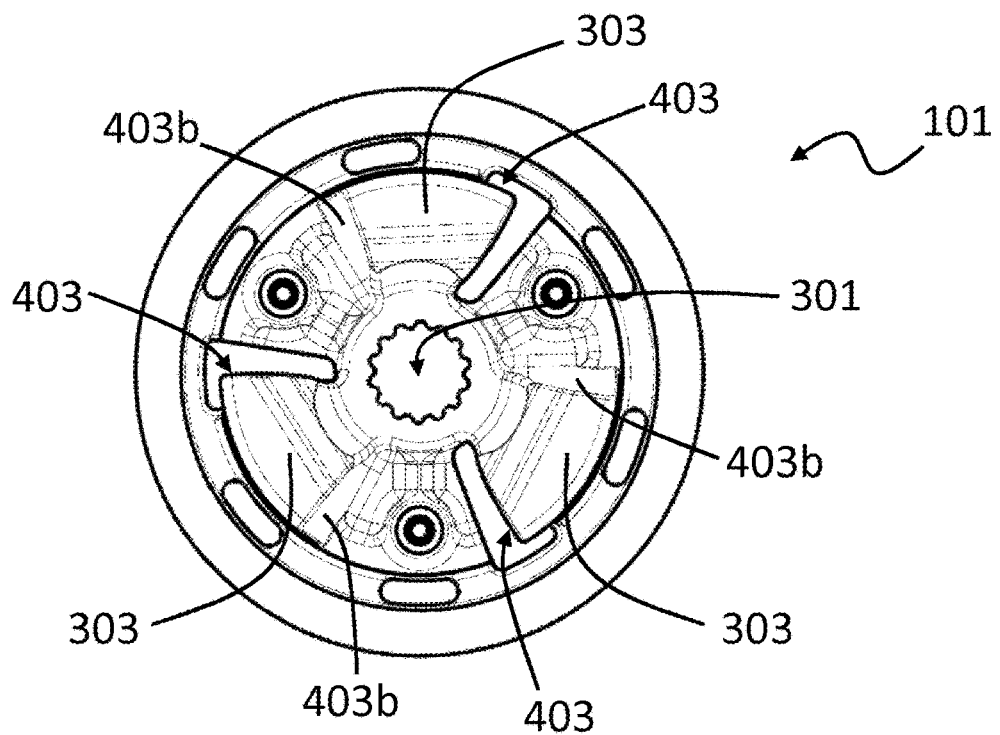
FIG. 4 shows a top view of the fixed hub of FIG. 3.

FIG. 4 shows a top view of the fixed hub 101, in which the first sliding elements 303 are better visible.

The first sliding elements 303 comprise respective first sliding surfaces 403 and 403b opposite each other, which are sloped according to a helix. Each of the sliding surfaces 403 and 403b is engaged when the clutch is subjected to a driving torque or to a motoring torque, respectively.

In particular, the sliding surfaces 403 and 403b are radially arranged with respect to the center of the fixed hub 101 and lie on planes that are sloped by a helix angle with respect to the axis of the fixed hub 101.

Preferably, the fixed hub 101 comprises two or more first sliding elements that are arranged radially along a perimeter of the fixed hub 101. Two sliding elements would in fact be enough to ensure the operation of the clutch; a greater number of sliding elements can allow a better operation for the clutch, thus there are three sliding elements in the preferred example considered herein.

In the preferred embodiment of FIG. 3, each of the three sliding elements 303 comprises at least one respective sliding surface 403 or 403b, which occupies a whole lateral face, so as to maximize the available sliding surface and to improve the operation and modulation of the clutch.

Figure 5:
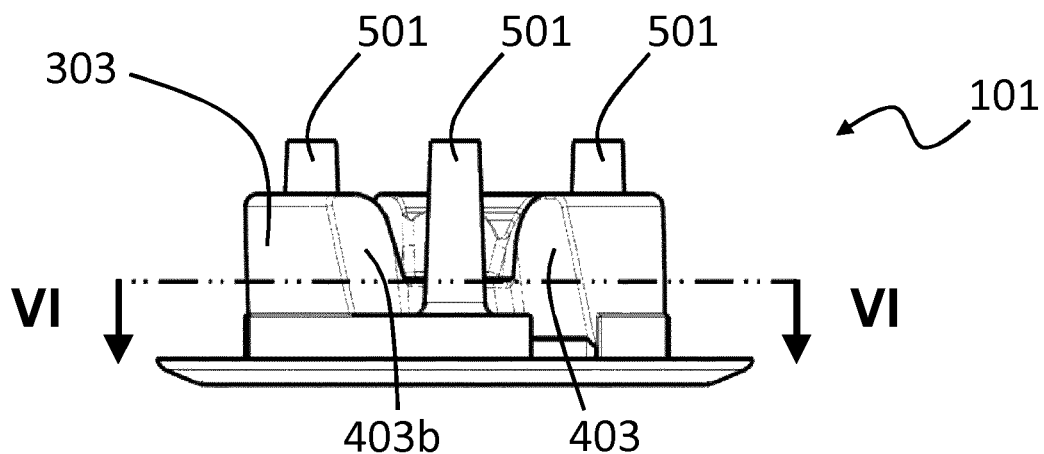
FIG. 5 shows a side view of the fixed hub of FIG. 3.

FIG. 5 shows a side view of the fixed hub 101, in which the columnar fixing elements 501, which are configured for passing through the closing springs 104, are visible.

Figure 6:
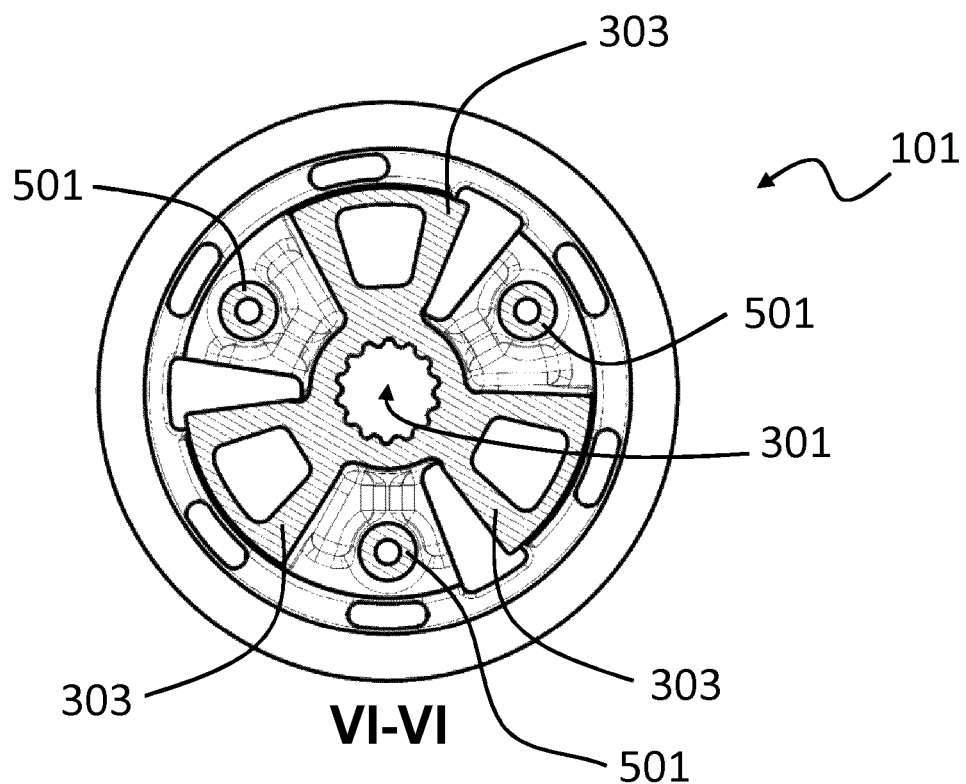
FIG. 6 shows a cross-sectional top view of the fixed hub of FIG. 3.

FIG. 6 shows a top view of the fixed hub 101 according to section VI-VI of FIG. 5.

In this sectional view it is possible to notice that the sliding elements 303 are internally hollow, in order to reduce the weight of the fixed hub 101.

Figure 7:
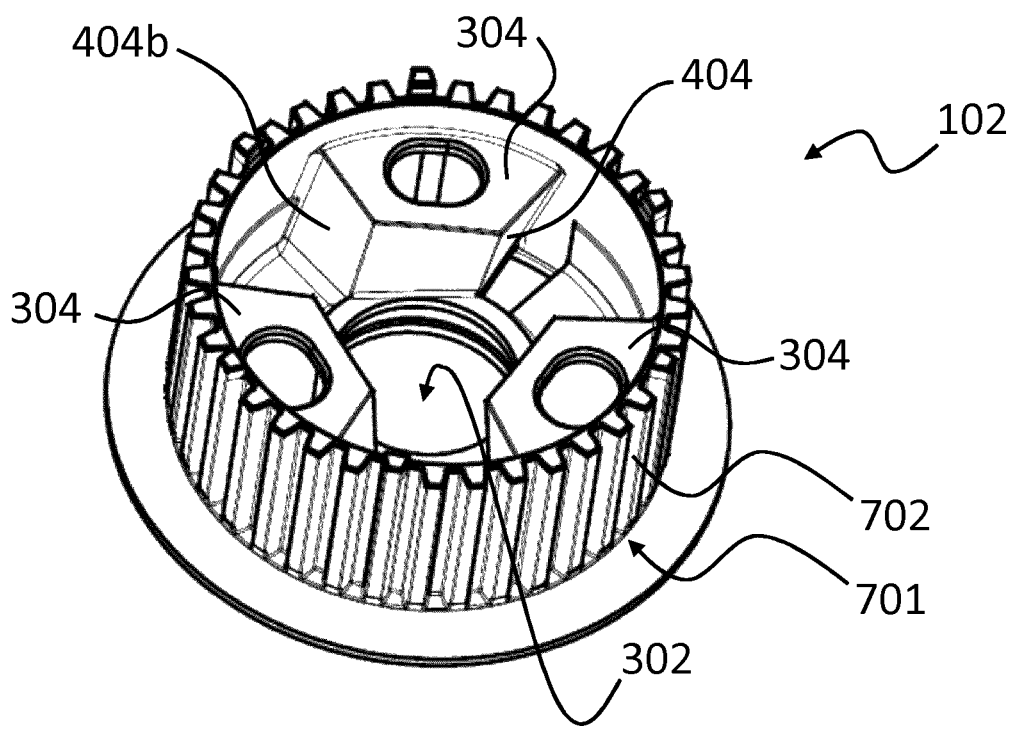
FIG. 7 shows a perspective bottom view of the moveable hub of FIG. 3.

FIG. 7 shows a perspective bottom view of the movable hub 102.

The movable hub 102 preferably comprises second sliding elements 304, configured for interacting with the first sliding elements 303 of the fixed hub 101, already described.

The second sliding elements 304 comprise respective second sliding surfaces 404 and 404b that are sloped according to the same helixes with respect to the sliding surfaces 403 and 403b.

In other words, the second sliding surfaces 404 and 404b are arranged radially with respect to the center of the movable hub 102 and lie on planes that are sloped by a same helix angle, compared with the helix angle of the first sliding surfaces 403 and 403b of the fixed hub 101.

In other words, the first sliding surfaces 403 or 403b and the second sliding surfaces 404 or 404b are configured for interacting and sliding with each other respectively, when the clutch 100 is subjected to a driving torque or to a motoring torque.

Preferably, the helix according to which the sliding surfaces are arranged has a predetermined pitch, with values preferably comprised between 250 mm and 3000 mm, in particular for clutches in oil bath. The value of the helix pitch is determinable based on the operation characteristics desired for the clutch and based on the type and specificity of the vehicle on which it is installed.

In general, it has been established that preferred values of the helix angle, considered the angle of the sliding surface with respect to an axial vertical of the movable hub and of the fixed hub, are such to be: comprised between 1° and 30°, preferably comprised between 3° and 6° for dry clutches and preferably comprised between 10° and 20° for clutches in oil bath (of the "wet" type). Such values are illustrative but not limiting of the adoptable helix angles.

Once the movable hub 102 has been axially mounted on the fixed hub 101, the second sliding surfaces 404 or 404b can mate with the first sliding surfaces 304 or 304b. In this way, the second sliding surfaces 404 or 404b, by interacting with the first sliding surfaces 304 or 304b, are adapted to get the movable hub 102 closer or farther with respect to the fixed hub 101, when they are subjected to a torque, thus varying the axial load that compresses the discs 103, according to what has already been described.

Preferably, the movable hub 102 respectively comprises three or more second sliding elements 304, congruently with the fixed hub 101 with which it couples. The sliding elements 304 are also radially arranged along a perimeter of the movable hub 102. As said, two or more second sliding elements, congruently with the fixed hub 101, would be appropriate.

Moreover, the movable hub 102 preferably comprises a cylindrical drawing element 701, which comprises an external drawing surface 702. Said drawing element 701 preferably has a "shell" structure, i.e. internally hollow.

The drawing element 701 is configured for housing the plurality of discs 103, which are assembled thereon.

The external drawing surface 702 of the drawing element 701 is shaped so as to couple with the toothing of the driven discs 202, in particular comprising a plurality of grooves parallel to each other.

In the preferred embodiment, all of the driven discs are coupled with the external drawing surface 702 of the movable hub 102; this allows operating with sliding surfaces having higher helix pitches, to the advantage of a better modulation of the clutch during the engagement.

Preferably, the external drawing surface 702 comprises a plurality of through-holes for lubricant fluid, not visible in the figure.

Figure 8:
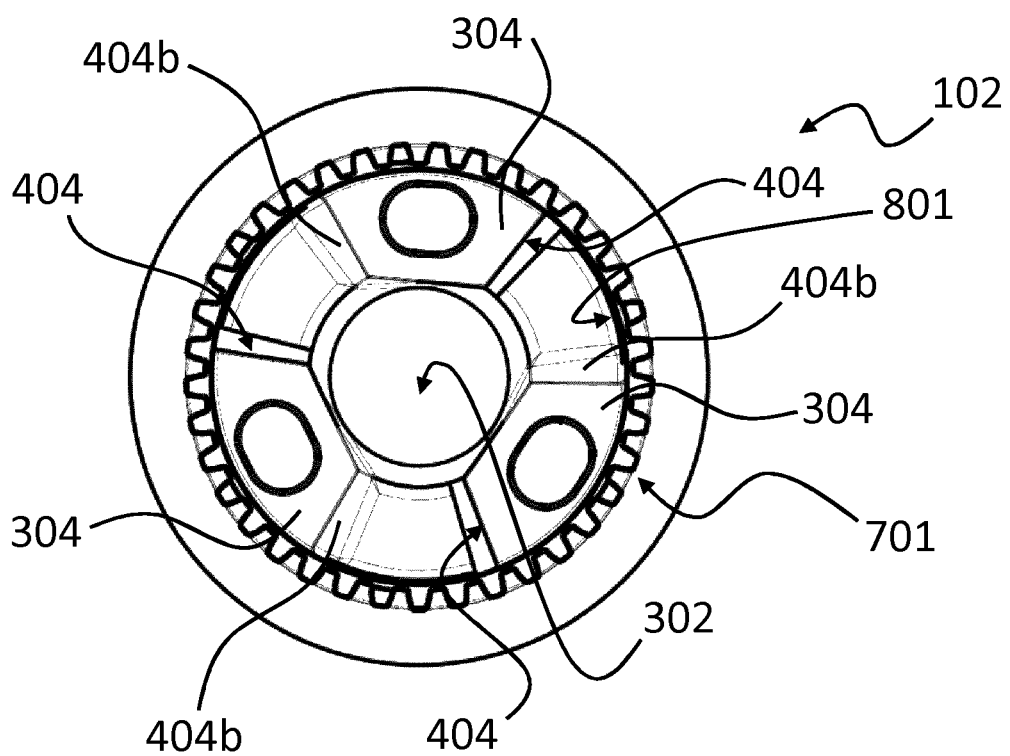
FIG. 8 shows a further view of the moveable hub of FIG. 7.

FIG. 8 shows a bottom view of the movable hub 102.

In the preferred embodiment of FIG. 8, each of the sliding elements 304 comprises a respective sliding surface 404 that occupies a whole lateral face, so as to maximize the available sliding surface and to improve the operation and modulation of the clutch.

Preferably, also the surface 404b opposite the sliding surface 404 constitutes a sliding surface of the sliding element 304, which is engaged when the clutch is subjected to a motoring torque, instead of a driving torque.

Preferably, the second sliding elements 304 of the movable hub 102 are adjacent to an internal surface 801 of the drawing element 701. More preferably, the second sliding surface 404 of the movable hub 102 is contiguous to the internal surface 801 of the drawing element 701.

In general, the second sliding elements 304 of the movable hub 102 could be proximal, namely could have a distance from the internal surface 801 of the drawing element 701 that is less than the magnitude of a preponderant dimension of the second sliding elements themselves.

With the second sliding elements 304 proximal, preferably adjacent, to the drawing element 701, it is possible to free space in the central area of the movable hub 102. As a consequence, advantageously, the dimension of the central access hole 302 can be greater, and, inside the clutch, access to the central coupling hole 301 of the fixed hub 101 is improved with a consequent improvement of the pre-assembled clutch installation.

Figure 9:
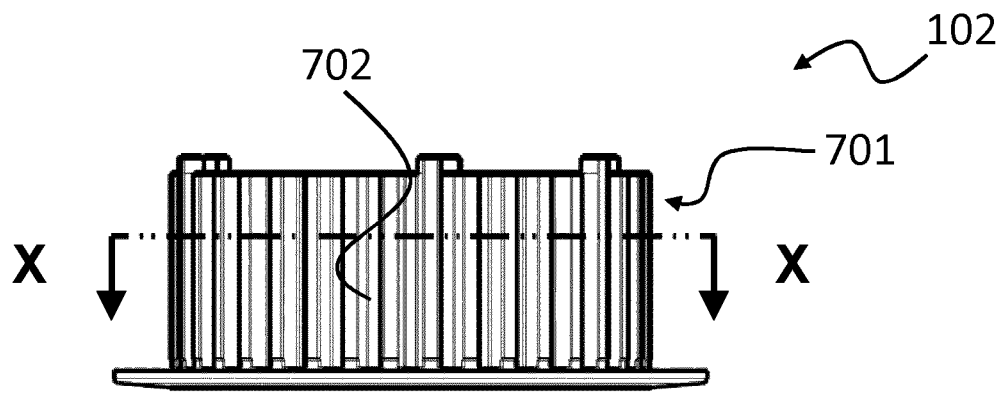
FIG. 9 shows a side view of the moveable hub of FIG. 7.

FIG. 9 shows a side view of the movable hub, in which the external drawing surface 702 of the drawing element 701 is visible.

Figure 10:
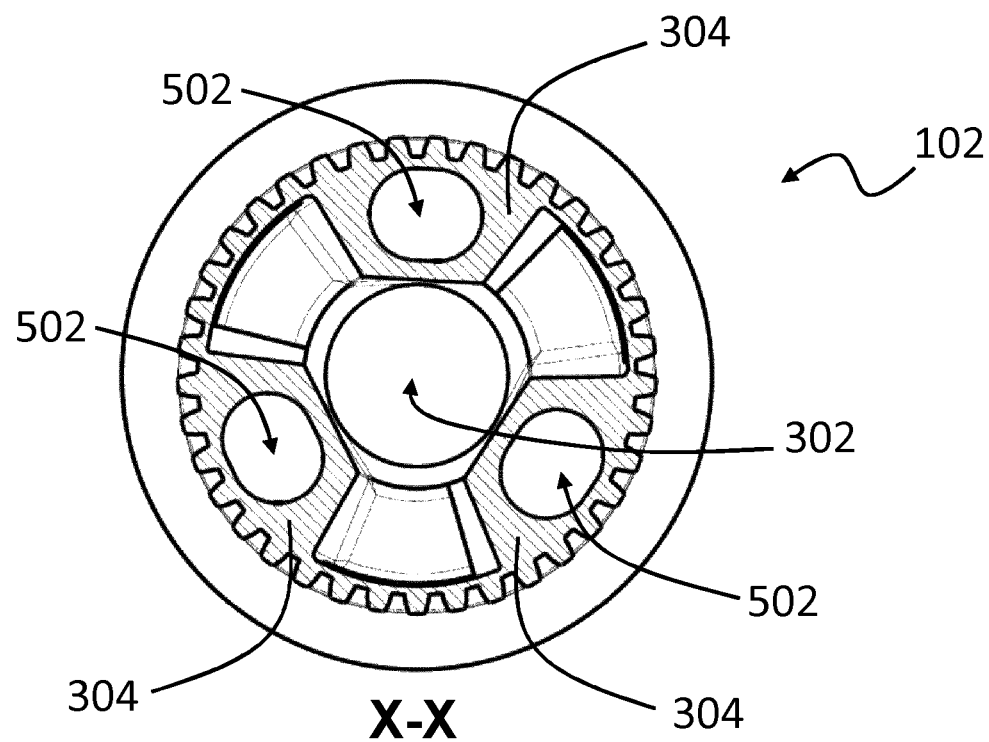
FIG. 10 shows a cross-sectional view of the moveable hub of FIG. 7.

FIG. 10 shows a bottom view of the movable hub 102 according to section X-X of FIG. 9.

The movable hub 102 comprises a plurality of housing sockets 502 that are configured for housing the respective closing springs 104, outside which the columnar fixing elements 501 already described are insertable.

In order to facilitate the passage of the columnar fixing elements 501 during the mounting of the fixed hub 101 and of the movable hub 102, and to allow the operation of the clutch when the movable hub 102 gets closer or farther with respect to the fixed hub 101, the housing sockets 502 have at least one section having an elongated shape along a direction that is tangential to the movable hub 102.

In this way, by respecting the constraint imposed by the respective sliding surfaces, it is possible to couple the movable hub 102 and the fixed hub 101 axially with each other, with a slight rotation for the assembly, as it will be further described.

FIG. 11 shows a cross-sectional perspective view of the fixed hub 101 and of the movable hub 102.

In this view, the hubs are just partially disassembled with each other (in an exemplified and not operating configuration), so that it is easier to observe the interaction between the first sliding elements 303 and the second sliding elements 304. In fact, the first sliding surfaces of the first sliding elements 303 and the second sliding surfaces of the second sliding elements 304 are configured for interacting with each other, since they are in contact in the operating position: in particular, said sliding surfaces, resting one upon the other, mutually slide along a helix trajectory according to which they are sloped, under the respective conditions in which they are subjected to a driving torque or to a motoring torque, according to what has already been described.

In this way, the interaction of the first sliding surfaces with the second sliding surfaces involves a partial rotation and especially a variation of the relative distance between the movable hub 102 and the fixed hub 101.

Preferably, the housing sockets 502 comprise respective holed end abutment surfaces 503, through which the columnar fixing elements 501 are inserted, along with the respective closing springs 104.

The annular retaining element 105 (not visible in FIG. 11) is preferably constrained to the columnar fixing elements 501 by means of suitable screws 504, so as to retain the closing springs 104 (not visible in FIG. 11) in the respective housing sockets 502.

In a variant of the clutch (not represented), the closing springs 104 could be replaced by springs of the "belleville" or "cup" type, by suitably sizing the sliding elements and the respective surfaces, thus making the housing sockets or the fixing columnar elements superfluous in some possible embodiments.

FIG. 12 exemplifies the method for mounting the clutch 100.

In sub-FIG. 12(a), a movable hub 102 comprising a central access hole 302 is provided. Separately, a fixed hub 101 comprising a central coupling hole 301 for a rotating shaft of the vehicle is also provided.

In sub-FIG. 12(b), a plurality of discs 103 mounted on the movable hub 102 is provided.

In sub-FIG. 12(c), the movable hub 102 mounted in the axial direction on the fixed hub 101 is provided. In this configuration, the discs 103 result interposed between the fixed hub 101 and the movable hub 102.

The fixed hub 101 and the movable hub 102 are shaped so as to rotate jointly with each other. The fixed hub 101 and the movable hub 102 are also shaped so as to slide axially with each other, getting farther or closer with each other during the joined rotation, so that the fixed hub 102 and the movable hub 102, preferably through respective flanges, exert a variable axial load onto the plurality of discs 103.

The embodiment of the clutch unit represented in sub-FIG. 12(c) thus essentially represents a clutch according to the present invention when it is provided pre-assembled.

Indeed, at least the fixed hub 101, the movable hub 102 and the plurality of discs 103 are preferably provided in a pre-assembled clutch unit, whose mounting occurs directly on the rotating shaft of the concerned vehicle.

In sub-FIG. 12(d), a plurality of closing springs 104 are provided in respective housing sockets, along with an annular retaining element 105 that retains them. The annular retaining element 105 is retained by suitable screws 504 constrained to columnar fixing elements.

In sub-FIG. 12(e), the preferred embodiment of the pre-assembled clutch unit is shown. Since said clutch unit has pre-assembled closing springs and annular retaining element, it allows easy access, internally through the plurality of discs 103, to the central coupling hole 301, so as to allow the mounting thereof directly on the rotating shaft of the concerned vehicle.

In fact, the central access hole 302 makes the central coupling hole 301 clearly accessible, as it is also visible in the figure, passing internally through the plurality of discs interposed 103, in order to operate locking means with a rotating shaft, as it will be further described.

In particular, the annular retaining element 105 results proximal to the free face of the flange of the movable hub 102 and comprises a central shaping that is sized so as not to impede access to the central access hole 301 of the fixed hub 101, for installing the pre-assembled clutch unit.

The clutch unit thus pre-assembled is configured for being inserted into a clutch housing (not shown), in particular coupling thereto the driving discs between the discs 103, in order to proceed with the mounting, as it will be successively described.

In sub-FIG. 12(f), the central coupling hole 301 is coupled with a rotating shaft 1200 of the vehicle, preferably a primary gear shaft. Suitable locking means 1201 are also prepared, preferably comprising a locking nut and a relative washer.

Figure 12G:
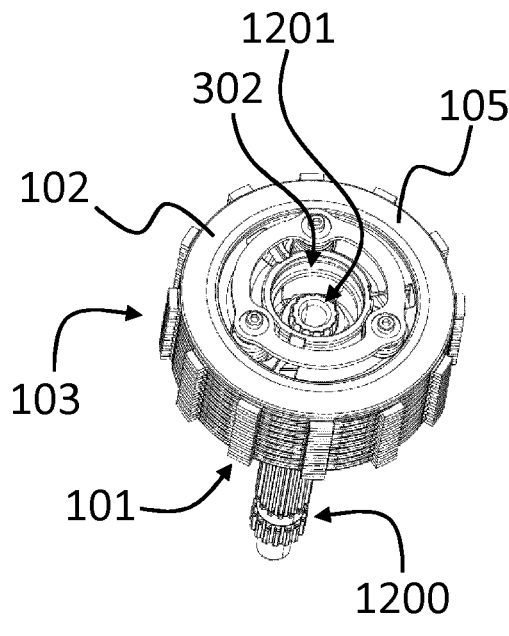
FIG. 12 in sub-figures (a) to (h) exemplifies the method for mounting the clutch of FIG. 1.

In sub-FIG. 12(g), the central coupling hole 301 is coupled with the rotating shaft 1200, in particular at a threaded end thereof. Through the central access hole 302 it is easy to access the area of the central coupling hole 301, internally through the plurality of discs 103 interposed. In this way, it is possible to operate the locking means 1201, for instance by tightening the nut, in order to integrally constrain the central coupling hole with the rotating shaft 1200.

It is clear that the mounting operation of the clutch according to the present invention is practical and convenient.

Figure 12H:
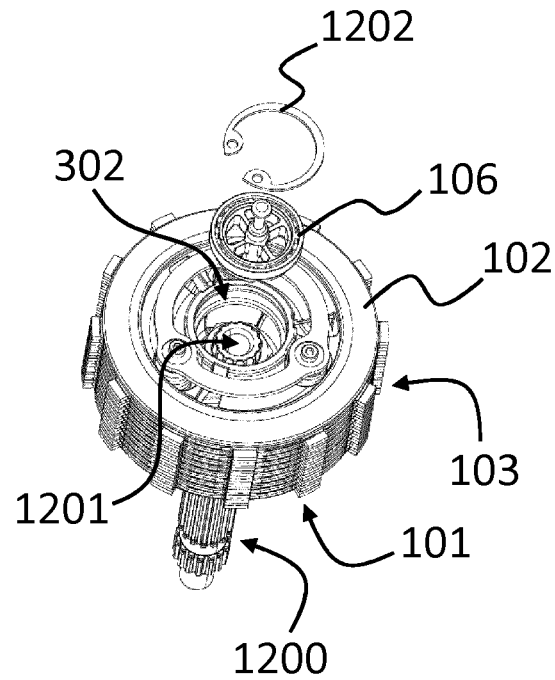

In sub-FIG. 12(h), a pusher 106 is inserted into the central access hole 302 of the movable hub 102. The pusher 106 has a diameter such as to be inserted into the central access hole and therein to be coupled with the movable hub 102 being retained by retaining means 1202 such as a Seeger ring. The pusher 106 is configured for commanding the disengagement of the clutch, according to what has already been described.

It should be thus noticed that the clutch according to the present invention does not require a dedicated "push-plate" element, but it actually allows saving a component compared to a "three-piece" clutch, providing the appropriate functionality through the features of the components described herein.

Figure 13:
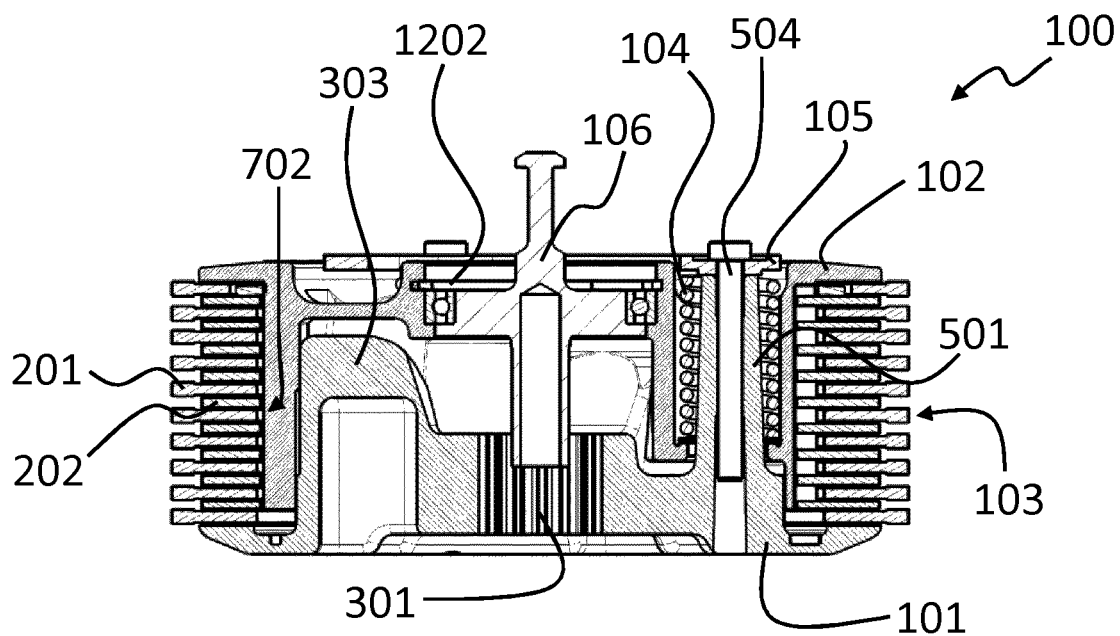
FIG. 13 shows a cross-sectional side view of the clutch of FIG. 1, once it has been assembled.

FIG. 13 shows a cross-sectional side view of the clutch 100, in which it is possible to notice the internal components already described.

It is clear that in the clutch 100, by simply removing the retaining element 1202 and the pusher 106, it is possible to access the central coupling hole 301 by internally passing through the plurality of discs 103 interposed between the fixed hub 101 and the movable hub 102.

The clutch according to the present invention can advantageously be provided pre-assembled, with a pack of discs 103 already closed, thus simplifying its installation and mounting on the vehicle. Moreover, the tightening of the locking means (such as the nut) on the rotating shaft is simplified, to the advantage of a better ease of installation and servicing.

The structure of the clutch according to the present invention, by providing an external drawing surface 702 of the movable hub 102 that preferably couples with all of the driven discs 202, allows a better modulation of the clutch.

Moreover, thanks to the better transfer of the torque on the discs, a clutch according to the present invention is less affected by wear effects, since it can use discs with an optimal resistant section.

Then, thanks to the structure of the clutch according to the present invention it becomes possible to choose the helix pitch of the sliding surfaces with greater freedom of design. In particular, it is possible to select higher values for the helix pitch of the sliding surfaces, to the advantage of a lesser wear and a more modulable response of the clutch command.

Advantageously, for the axial assembly of the fixed hub 101 on the movable hub 102, it is not necessary to identify a unique initial position, but it is possible to merge the hubs together in any radial position in which the coupling elements are configured for engaging, for instance 120° according to the preferred embodiments.

Figure 14:
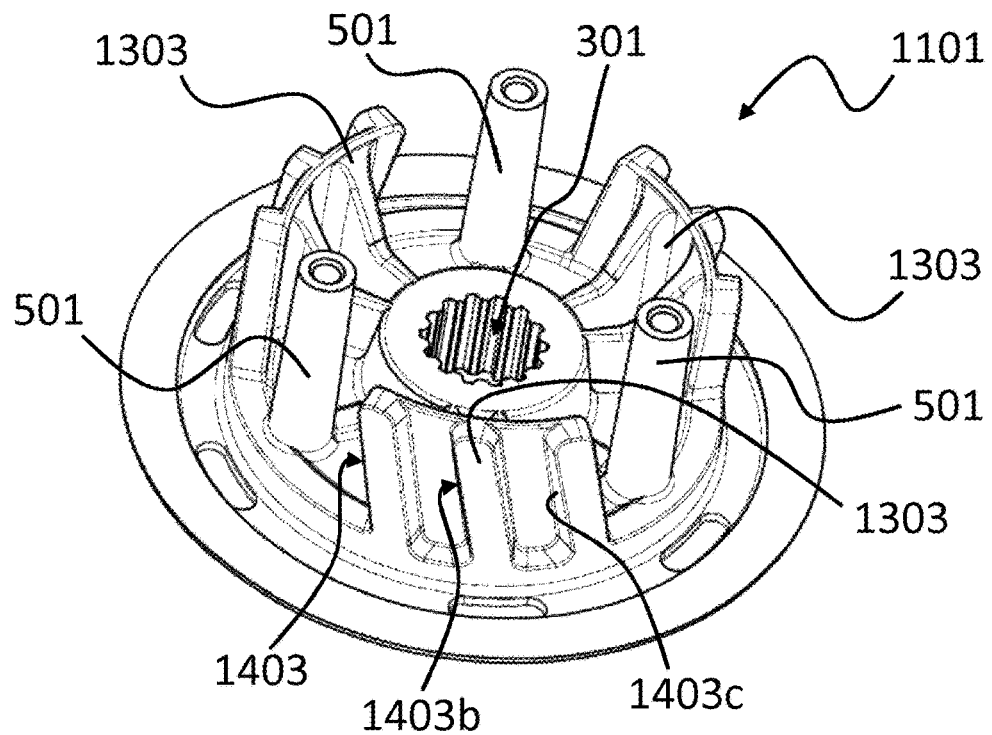
FIG. 14 shows an alternative embodiment of a fixed hub of a clutch according to the present invention.

FIG. 14 shows an alternative embodiment of a fixed hub 1101 of a clutch according to the present invention.

The fixed hub 1101 comprises first sliding elements 1303 supported by radial ribs. The first sliding elements 1303 respectively comprise first sliding surfaces 1403, 1403b, 1403c sloped according to a helix. In particular, each sliding element 1303 comprises a respective plurality of sliding surfaces 1403, 1403b, 1403c sloped according to a helix.

It is noticed that the sliding surfaces 1403, 1403b, 1403c individually have surfaces smaller than the sliding surfaces 403 already described, but they overall identify an equivalent sliding surface.

In other words, the sliding element 1303 provides a plurality of sliding surfaces that are functionally equivalent to the embodiment of the already described sliding element 303.

In this way, though ensuring an unaltered operation of the clutch having optimal modulation, there is a reduction in dimensions in the radial direction.

Figure 15:
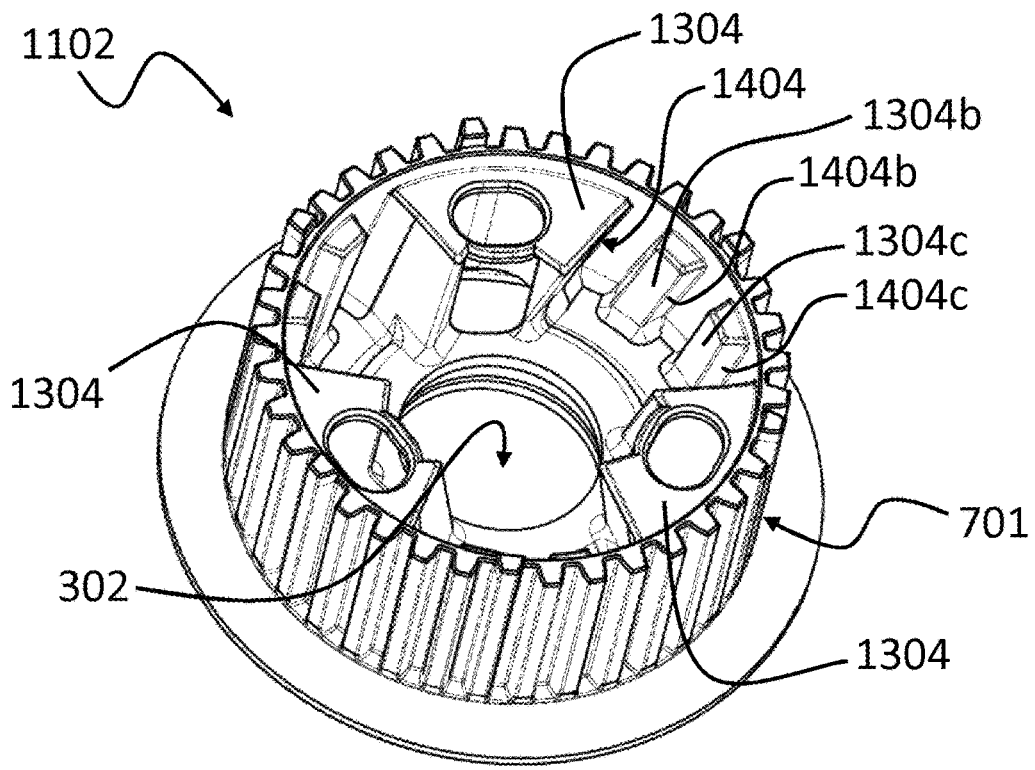
FIG. 15 shows an alternative embodiment of a moveable hub of a clutch according to the present invention.

FIG. 15 shows an alternative embodiment of a movable hub 1102 of a clutch according to the present invention.

The movable hub 1102 is configured for being mounted along an axial direction on the fixed hub 1101, already described.

The movable hub 1102 comprises a plurality of second sliding elements 1304, 1304b, 1304c. The second sliding elements 1304, 1304b, 1304c are adjacent to the internal surface of the drawing element 701.

The plurality of second sliding elements 1304, 1304b, 1304c respectively comprise a plurality of second sliding surfaces 1404, 1404b, 1404c sloped according to a helix.

It is clear that the sliding surfaces 1403, 1403b and 1403c of the first sliding elements 1303 of the fixed hub 1101 are configured for sliding on the respective sliding surfaces 1404, 1404b, 1404c of the second sliding elements 1304, 1304b, 1304c.

It is furthermore noticed that the sliding surfaces 1404, 1404b, 1404c individually have surfaces smaller than the sliding surfaces 404 already described, but they overall identify an equivalent sliding surface. In other words, the sliding elements 1304, 1304b, 1304c provide a plurality of sliding surfaces that are functionally equivalent to the embodiment of the sliding element 304 already described. In this way, though ensuring an unaltered operation of the clutch having optimal modulation, there is a reduction in the overall dimensions in the radial direction.

The specific numbering of the elements used in FIGS. 14 and 15 is to be considered illustrative and not limiting, meaning that i) not all sliding elements and sliding surfaces have been denoted, in order not to diminish the clarity of the figure; ii) not necessarily is there a unique correspondence between first and second sliding surfaces as denoted, but the skilled person understands that said surfaces are configured for being arranged side by side to each other and for sliding with each other.

It is clear that the fixed hub 1101 and the movable hub 1102 are configured for having sliding surfaces 1304, 1304b, 1304c and respectively 1403, 1403b and 1403c, which can mate with each other and which are adapted to slide under the action of a driving torque acting onto the clutch, according to what has already been described.

Likewise, the sliding element 1303 and the second sliding elements 1304, 1304b, 1304c comprise further sliding surfaces (not denoted by reference numbers, for clarity in the figures) that are opposite the ones considered and that can mate with each other and are adapted to slide under the action of a motoring torque acting onto the clutch, according to what has already been described.

In general, a fixed hub and/or a movable hub of the clutch according to the present invention can advantageously be structured so as to be obtained from a die-casting single piece, thus avoiding undercuts problems; this precaution improves the industrialization of the product.

Moreover, in an alternative embodiment (not shown), the sliding elements of opposed sliding surfaces could be provided, which have helix angles different from each other, in order to confer a different operation of the clutch when the fixed and movable hubs get closer or farther with each other, since they correspond to the contact of some sliding surfaces or to the contact of the opposite sliding surfaces. In this way, it becomes possible to confer a different modulation and response of the clutch that is optimized for the features of the vehicle.

For instance, it could be possible to provide sliding surfaces for operation under "wide open throttle" conditions with a certain helix pitch, for example of 1200 mm, whereas opposite sliding surfaces could be provided for "motoring" operation with a helix pitch smaller than the aforesaid, for instance of 900 mm.

Considering the above reported disclosure, the skilled person will be able to conceive further changes and variants, in order to meet contingent and specific needs. Therefore, the embodiments herein described are provided by way of non-limiting examples of the invention.

What is claimed is:

1. A clutch comprising:
a fixed hub comprising a central coupling hole, said central coupling hole being configured for coupling with a rotating shaft;
a movable hub configured for being mounted along an axial direction onto said fixed hub;
a plurality of discs configured for being interposed between said fixed hub and said movable hub;
wherein said fixed hub and said movable hub are shaped so as to rotate jointly with each other and so as to slide axially with each other, getting farther or closer such that said fixed hub and said movable hub exert a variable axial load onto said plurality of discs thereby transmitting a torque,
and wherein said movable hub comprises a central access hole, said central access hole being configured for allowing access to said central coupling hole passing internally through said plurality of discs interposed, so as to operate locking means for said coupling of the fixed hub with said rotating shaft,
wherein said fixed hub comprises first sliding elements, respectively comprising first sliding surfaces sloped according to a helix,
wherein said movable hub comprises second sliding elements, respectively comprising second sliding surfaces sloped according to said helix and configured for mating with said first sliding surfaces,
said first sliding surfaces and said second sliding surfaces being adapted to move said movable hub farther or closer with respect to said fixed hub when subjected to a torque, so as to vary said axial load onto said plurality of discs,
wherein said movable hub further comprises a cylindrical drawing element comprising an external drawing surface,
said plurality of discs being assembled onto said drawing element of said movable hub,
said drawing surface being shaped so as to couple with an internal toothing of driven discs,
wherein said second sliding elements of said movable hub are adjacent to an internal surface of said drawing element.

2. The clutch according to claim 1, wherein said second sliding surfaces are contiguous with said internal surface of said drawing element.

3. The clutch according to claim 2, wherein said drawing surface is configured to couple with an internal toothing of all of the driven discs among said plurality of discs.

4. The clutch according to claim 1, comprising at least two said first sliding elements and respective at least two said second sliding elements, radially arranged along respective perimeters of said fixed hub and said movable hub.

5. The clutch according to claim 1, wherein each of said first sliding elements comprises at least one first sliding surface occupying a whole lateral face of said each of said first sliding elements, and wherein each of said second sliding elements comprises at least one second sliding surface occupying a whole lateral face of said each of said second sliding elements.

6. The clutch according to claim 1, wherein each of said first sliding elements comprises a respective plurality of said first sliding surfaces, and wherein each of said second sliding elements comprises a respective plurality of said second sliding surfaces.

7. The clutch according to claim 1, further comprising a plurality of closing springs configured for applying an axial closing load between said fixed hub and said movable hub, wherein said movable hub further comprises a respective plurality of housing sockets for said closing springs, said housing sockets comprising respective abutment holed end surfaces, and wherein said fixed hub further comprises a respective plurality of columnar fixing elements configured for being inserted in said housing sockets through said abutment holed end surfaces so as to internally pass through said closing springs, said clutch further comprising an annular retaining element configured for being constrained to said columnar fixing elements for retaining said closing springs within said housing sockets.

8. The clutch according to claim 7, wherein said annular retaining element is proximal to a free face of a flange of said movable hub and comprises a central shaping being sized so as not to impede access to said central access hole of said movable hub.

9. The clutch according to claim 7, wherein said second sliding elements of said movable hub respectively comprise said housing sockets for said closing springs, said housing sockets comprising at least one section having elongated shape along a direction tangential to said movable hub, so as to allow passage of said columnar fixing elements during mounting and/or operating of said movable hub onto said fixed hub.

10. The clutch according to claim 1, further comprising a pusher having a diameter such as to be inserted in said central access hole of said movable hub and therein retained by retaining means, said pusher being configured for commanding disengagement of said clutch by distancing said movable hub with respect to said fixed hub.

11. The clutch according to claim 1, wherein at least said fixed hub, at least said movable hub and at least said plurality of discs are provided as a pre-assembled clutch unit.

12. A method for mounting the clutch according to claim 1, comprising:

providing the fixed hub comprising the central coupling hole;

providing the movable hub comprising the central access hole;

providing the plurality of discs mounted onto said movable hub;

providing said movable hub mounted along an axial direction onto said fixed hub, said discs resulting interposed between said fixed hub and said movable hub, said fixed hub and said movable hub being shaped so as to rotate jointly with each other and to slide axially with each other, getting farther or closer such that said fixed hub and said movable hub exert a variable axial load onto said plurality of discs thereby transmitting a torque;

coupling said central coupling hole with the rotating shaft;

accessing said central coupling hole, passing through said central access hole and internally through said plurality of discs interposed;

operating locking means so as to constrain said central coupling hole onto said rotating shaft.

13. The method for mounting according to claim 12, wherein at least said movable hub, at least said plurality of discs and at least said fixed hub are provided pre-assembled with each other.

14. The clutch according to claim 1, wherein said drawing surface is configured to couple with an internal toothing of all of the driven discs among said plurality of discs.

* * * * *